F. C. VINEY.
FLUID METER.
APPLICATION FILED AUG. 16, 1916.

1,241,170.

Patented Sept. 25, 1917.
4 SHEETS—SHEET 2.

INVENTOR
FREDERICK C. VINEY
BY HIS ATTORNEY
Harry Smith

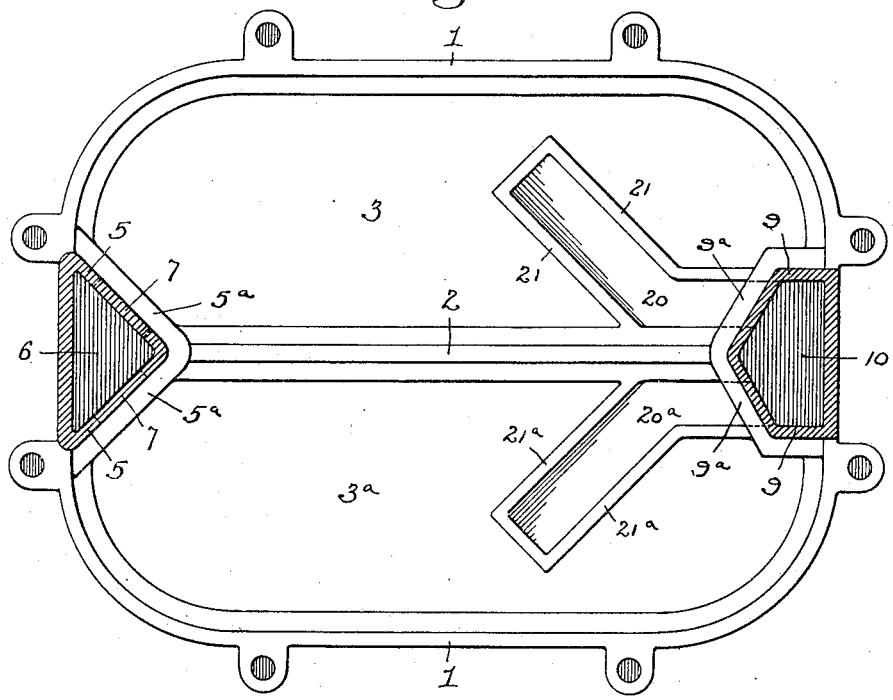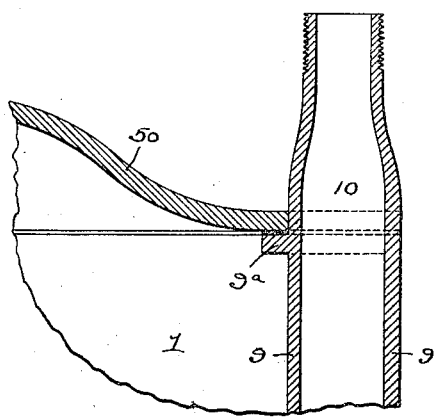

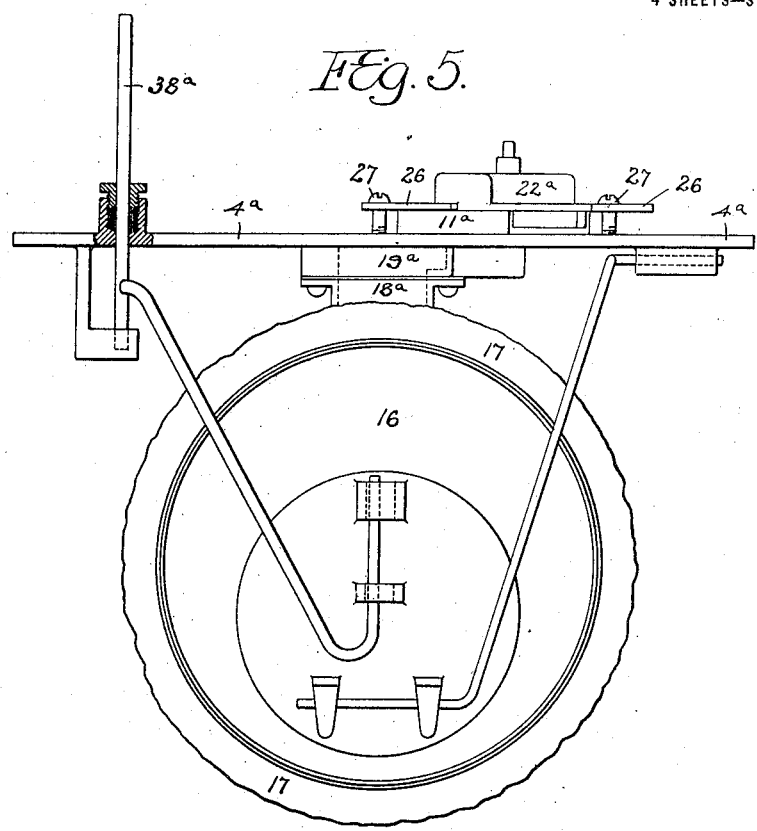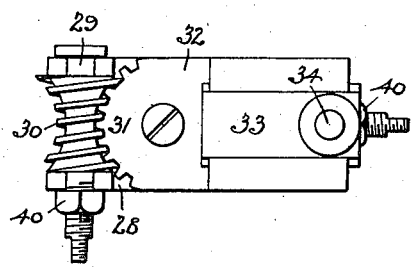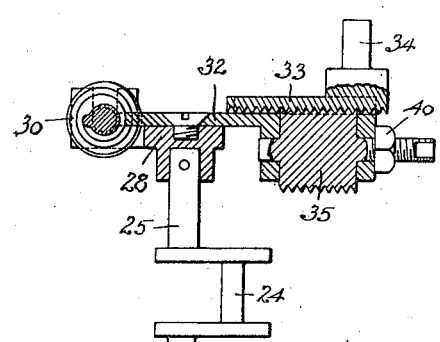

UNITED STATES PATENT OFFICE.

FREDERICK C. VINEY, OF PHILADELPHIA, PENNSYLVANIA, ASSIGNOR TO JOHN H. BLYE, OF PHILADELPHIA, PENNSYLVANIA.

FLUID-METER.

1,241,170.  Specification of Letters Patent.  Patented Sept. 25, 1917.

Application filed August 16, 1916. Serial No. 115,166.

*To all whom it may concern:*

Be it known that I, FREDERICK C. VINEY, a citizen of the United States, residing in Philadelphia, Pennsylvania, have invented certain Improvements in Fluid-Meters, of which the following is a specification.

My invention relates to fluid meters generally, but, for convenience, the meter will, in the following description, be referred to as a gas meter.

One object of my invention is to so construct a meter of the duplex bellows type as to permit ready accessibility to both front and back of each bellows, and to provide for the ready application or removal of the bellows structures. Another object is to provide for application of the cover to or its removal from the main casing after the latter has been connected to the supply and discharge pipes without disturbing said connections, another object is to prevent the escape of any gas which may leak through the stuffing box of the primary shaft of the registering device, a further object is to provide for changing the circumferential position of the bellows-operated crank pin in respect to the valve-operating crank pin, a still further object is to transmit the movement of the latter crank pin to the valves without side thrust upon the latter, and a final object is to effect adjustment of the bellows-operated crank pin by means of a tool introduced from the outside of the valve chamber without removing the cover from the latter.

In the accompanying drawings—

Fig. 4 is a top view, partly in section, of the casing of the meter with all of the detachable parts removed therefrom;

Fig. 5 is a side elevation of one of the bellows carrying valve plates removed from the casing of the meter;

Fig. 6 is a top view, on an enlarged scale, of the bellows-operated crank pin and its carrying and adjusting devices;

Fig. 7 is a longitudinal sectional view of the same, and

Fig. 8 is a longitudinal section of part of one end of the meter casing and cover plate.

Figure 1:
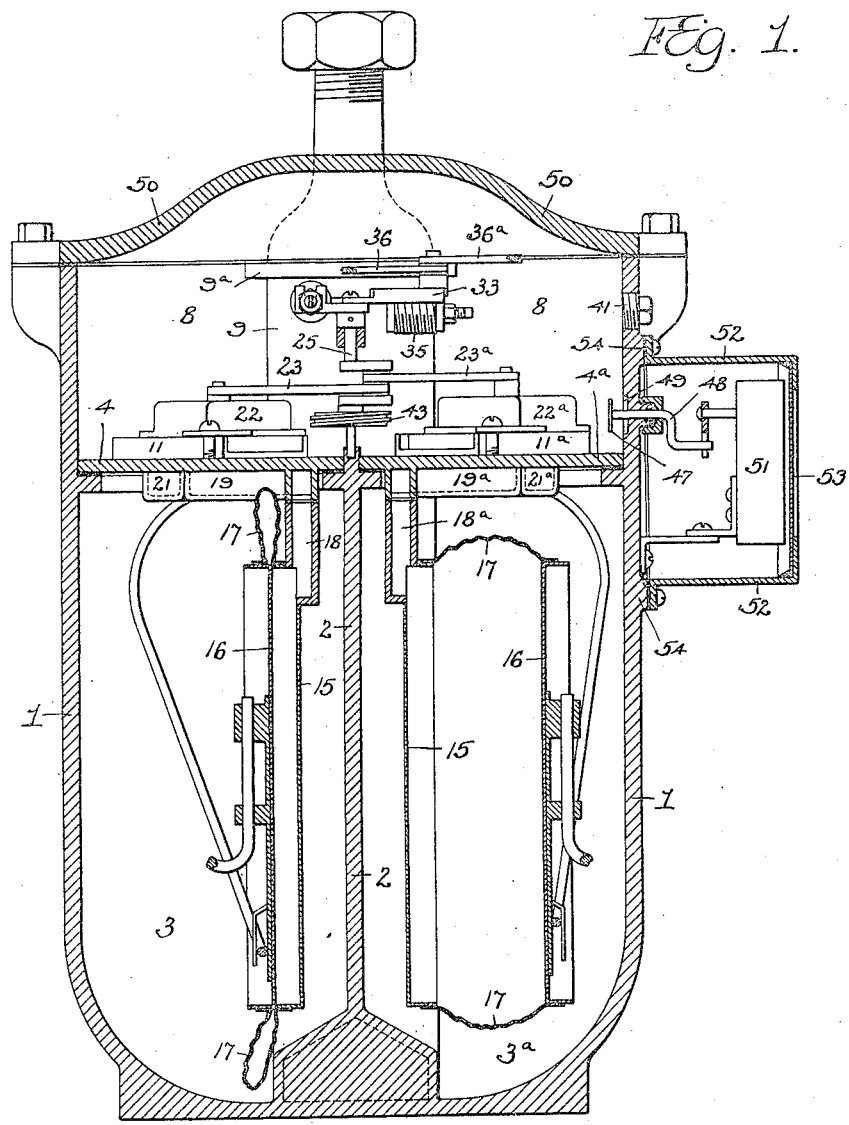
Figure 1 is a transverse vertical section of a gas meter of the type to which my invention relates and illustrating said invention.

In the drawing, 1 represents the casing of the meter which is of cast metal and has a central partition 2 whereby the interior of the casing is divided into two bellows chambers 3 and $3^a$, as shown in Fig. 1. The chamber 3 is closed at the top by a cap plate 4 detachably seated upon internal horizontal flanges projecting from the casing 1 and partition 2, said seats being suitably packed so as to form gas-tight joints. A cap plate $4^a$ similarly closes the upper end of the chamber $3^a$, as shown in Fig. 1.

At one end of the casing 1 is an internal casing 5 inclosing the inlet passage 6 for the gas, said casing 5 having formed therein openings 7 (Figs. 2 and 4) which provide free communication between the passage 6 and the valve chamber 8 formed in the casing 1 above the cap plates 4 and $4^a$, as also shown in Fig. 1. At the opposite end of the casing 1 is an internal casing 9 inclosing the gas outlet passage 10.

Formed on or secured to the cap plate 4 is a valve seat 11 having therein a central port 12 and other ports 13 and 14 flanking the same. Secured to or forming part of the cap plate $4^a$ is a similar valve seat $11^a$ having a similar central port 12 and ports 13 and 14 flanking the same. Within each of the chambers 3 and $3^a$ of the casing is a bellows structure comprising a fixed inner plate 15 and a movable outer plate 16, the inner and outer plate of each bellows structure being connected by a bellows leather 17, as shown in Fig. 1.

Figure 3:
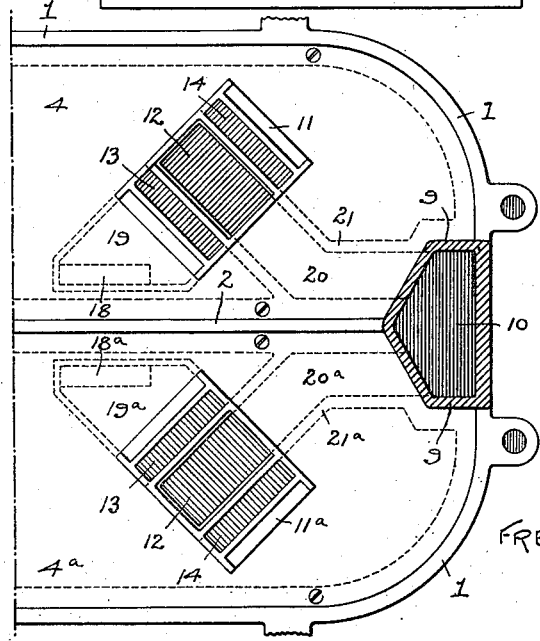
Fig. 3 is a similar view of part of the meter with the valves and valve-operating mechanism removed.

The interior of the bellows structure in the chamber 3 is in communication through a neck 18 with the interior of a flue casing 19 on the under side of the cap plate 4, the flue within said casing communicating with the port 13 of the valve seat 11, and, in like manner, the interior of the bellows structure within the chamber $3^a$ is in communication through a neck $18^a$ with the interior of a flue casing $19^a$ on the under side of the cap plate $4^a$, the flue within said casing communicating with the port 13 of the valve seat 11ª, as shown in Fig. 1, and by dotted lines in Fig. 3. The port 14 of the valve seat 11 communicates directly with the chamber 3 and the port 14 of the valve seat 11ª communicates directly with the chamber 3ª.

The necks 18 and 18ª of the bellows structures are, as shown in Fig. 1, detachably mounted upon the flue casings 19 and 19ª, respectively, so as to be readily removable therefrom, suitable gas-tight packings being interposed between the necks and flue casings in order to prevent leakage of gas at the joints.

The gas escape passage 10 is in communication with the central port 12 of the valve seat 11 through a duct 20 (Fig. 4) formed in a casing 21 cast with the casing 1 and partition 2, and closed at the top by the cap plate 4, and said escape passage 10 is also in communication, through a similar duct 20ª in a casing 21ª on the opposite side of the partition 2, with the central port 12 of the valve seat 11ª.

Figure 2:
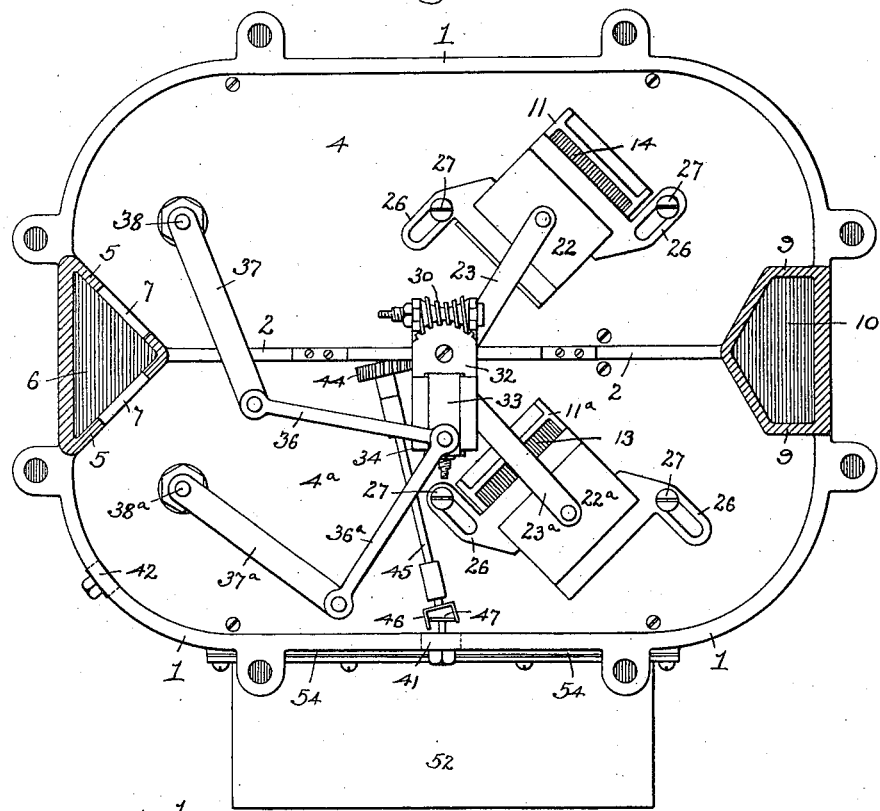
Fig. 2 is a top view, partly in section, of said meter with the cover plate removed therefrom.

Mounted upon the valve seat 11 is an ordinary D-valve 22 and upon the valve seat 11ª is mounted a similar valve 22ª, an upwardly projecting pin centrally disposed on the back of the valve 22 being connected by a link 23 to the pin 24 of a crank on a shaft 25 mounted so as to be free to rotate in suitable bearings within the valve chamber 8, a central pin of the valve 22ª being connected to said crank pin 24 through the medium of a link 23ª, as shown in Fig. 2. Rotating movement of the crank shaft 25 will, consequently, cause the valves 22 and 22ª to slide over the valve seats 11 and 11ª, respectively, each valve, when at the extremity of its inward movement, uncovering the port 14 of its respective valve seat, as shown at the top of Fig. 2, and when at the extremity of its outward movement, uncovering the port 13 of its valve seat, as shown at the bottom of Fig. 2.

When the valve is in the position shown at the top of Fig. 2, it opens communication between the ports 12 and 13 of its seat and when in the position shown at the bottom of Fig. 2 opens communication between the ports 12 and 14 of its seat, consequently, at the time that gas is passing from the chamber 8 into the bellows chamber 3 through the port 14 of the valve seat 11, it will be escaping from the interior of the bellows in said chamber through the ports 13 and 12, and duct 20 into the discharge passage 10. At the same time gas will be passing through the port 13 of the valve seat 11ª into the interior of the bellows in the chamber 3ª and gas will be escaping from said chamber outside of the bellows through the ports 14 and 12 of the valve seat 11ª and duct 20ª into said discharge passage 10.

The engagement of the links 23 and 23ª with pins centrally disposed on the backs of the valves 22 and 22ª insures the imparting of sliding movement to said valves without any side thrust thereupon, the valves being guided in their sliding movements by means of slotted fingers 26 on the valves engaging guide pins 27 on the cap plates 4 or 4ª, as shown in Fig. 2.

Mounted upon the upper end of the crank shaft 25, as shown in Fig. 7, is an arm member 28, and to suitable bearings thereon is adapted a shaft 29 (Fig. 6) carrying a worm 30 which meshes with a segmental rack 31 on an arm member 32, the latter being pivotally mounted on the top of the member 28 in line with the axis of the shaft 25, as shown in Fig. 7, and projecting from said shaft 25 in a direction opposite to that of the member 28.

Mounted so as to slide radially upon the top of the member 32 is a slide 33 carrying a crank pin 34 and having on its under side a rack which engages with a worm 35 mounted so as to turn in suitable bearings depending from the member 32, as shown in Fig. 7.

The crank pin 34 is connected by links 36 and 36ª to arms 37 and 37ª carried respectively by vertical shafts 38 and 38ª, the latter being located respectively in the chambers 3 and 3ª of the casing, and being mounted so as to be free to turn in stuffing boxes on the cap plates 4 and 4ª and in depending hangers on said plates, as shown in Fig. 5, the shaft 38 being connected in the usual manner to the outer plate of the bellows in the chamber 3 and the shaft 38ª being connected in like manner to the outer plate of the bellows in the chamber 3ª, hence, as said bellows are alternately distended and contracted rocking movement will be imparted to the shafts 38 and 38ª, the crank shaft 25 will be rotated, and sliding movement will be imparted to the valves 22 and 22ª as usual in gas meters of this type.

Radial movement to increase or decrease the throw of the crank pin 34 is imparted to the slide 33 by turning the worm 35 and the circumferential position of the crank pin 34 in respect to the crank pin 24 can be varied by turning the worm 30 and thereby swinging the arm member 32 on its pivotal axis.

Each worm 30 or 35 is normally locked in position by means of a lock nut 40 mounted upon the threaded shaft of the worm and contacting with the outer face of one of the bearings for said shaft, as shown in Figs. 6 and 7. When it is desired to turn the worm, the nut 40 is backed off sufficiently to permit said turning movement and when the adjustment has been completed said nut is again tightened.

In order to permit ready access from the outside of the casing to the shaft of the worm 35 and to its nut 40 the casing has an opening which is normally closed by a screw plug 41, as shown in Fig. 1, access to the shaft of the worm 30 and its nut 40 from the outside of the casing being had through an opening normally closed by a plug 42, as shown in Fig. 2.

By providing the chambers 3 and 3ª of the casing with independently removable cap plates 4 and 4ª each carrying the bellows for its respective chamber, said cap plates and bellows can be independently removed from the casing, and, when so removed, the bellows is accessible on all sides for inspection and repair, and when either cap plate has been removed from the casing its bellows can be readily detached therefrom and as readily reapplied, or a new bellows may be substituted for the old one if desired.

The crank shaft 25 has thereon the usual worm 43 for operating the counting mechanism, said worm engaging a worm wheel 44 on a shaft 45 which has at the end a fork 46, as shown in Fig. 2, for engaging arms 47 on the primary shaft 48 of the counting mechanism, as shown in Fig. 1, but, in order that said shaft and its arms may not interfere with the withdrawal of the cap plate 4ª, said shaft is movable longitudinally in its bearing, and the casing 1 has formed in its inner side a pocket 49 for the reception of the arms 47 when the shaft 48 is drawn outwardly.

When the cover plate 50 of the casing is removed all of the parts within the valve chamber 8 of the casing are readily accessible and either of the cap plates 4 or 4ª with its attached bellows mechanism, valve and valve seat can be independently removed after first disconnecting the links 23 and 36 or 23ª and 36ª.

The cover plate 50 is recessed at each end so as to fit around the inlet casing 5 or discharge casing 9, as shown in Fig. 8, and each of these casings has, in line with the top of the casing 1, a flange 5ª or 9ª with which the cover plate 50 forms a gas tight joint. By this means the cover plate 50 can, after the pipe connections of the meter have been made, be readily removed and reapplied without disturbing said connections.

The registering mechanism of the meter is contained in a casing 51 which in turn is inclosed within a casing 52 having a suitably sealed glazed front 53 through which the dials of the registering mechanism can be observed, and this casing 52 also extends beyond the stuffing box for the primary shaft 48 of the registering mechanism and has a flange forming a suitably packed joint with a seat 54 on the casing 1 so that any gas which leaks through the stuffing box of the shaft 48 is prevented from gaining access to the room or apartment in which the meter is located, this being important in the case of natural gas which is highly explosive and whose presence cannot be detected by the sense of smell.

I claim:

1. In a duplex fluid meter, the combination of a casing having a central partition with a chamber on each side thereof, independent cap plates for closing said chambers, and a bellows structure carried by each cap plate.

2. In a duplex fluid meter, the combination of a casing having a central partition with a chamber on each side thereof, independent cap plates for closing said chambers, and a bellows structure detachably mounted upon each cap plate.

3. In a duplex fluid meter, the combination of a casing having a discharge passage, a partition dividing said casing into two chambers, and a discharge duct in each of said chambers, with independently removable bellows-carrying cap plates for each of the chambers of the casing, said cap plates also covering said discharge ducts.

4. In a fluid meter, the combination of a casing, a bellows structure therein, a valve for directing fluid to and from said bellows structure, a bellows shaft, a crank shaft connected to said valve, a fixed arm on said crank shaft, another arm pivotally mounted upon said fixed arm, said pivoted mounting being in line with the axis of the crank shaft, a segmental rack on said pivoted arm, a worm engaging said rack, a worm shaft, bearings on said fixed arm for said worm shaft, a crank pin on said pivoted arm, and a connection between said crank pin and the bellows shaft.

5. In a fluid meter, the combination of a casing, a bellows structure therein, a valve for directing fluid to or from said bellows structure, a bellows shaft, a crank shaft connected to the valve, an arm on said shaft, a crank-pin-carrying slide on said arm, a connection between said crank pin and the bellows shaft, a rack on said slide, a worm engaging said rack, a worm shaft, and bearings on the arm for said worm shaft.

6. In a fluid meter, the combination of a crank shaft having a duplex arm with one part adjustable in respect to the other, an adjusting device having as elements a worm, a threaded worm shaft, a bearing therefor, a lock nut on said shaft, said nut engaging the bearing at one end of said shaft, a meter casing having therein an opening through which said nut is accessible from the outside of the casing, and a plug for normally closing said opening.

7. In a fluid meter, the combination of a casing, a removable cap plate therein, registering mechanism on the outside of the casing, a primary shaft for said registering mechanism mounted in a bearing on the casing and longitudinally movable therein, mechanism inside of the casing for operating said primary shaft, and a pocket on the inside of the casing for receiving that member of the operating mechanism which is carried by said primary shaft when the latter is moved outwardly in its bearing.

8. In a fluid meter, the combination of a main casing having a feed or discharge casing projecting therefrom, and having a flange in line with the top thereof, with a cover recessed for the reception of said projecting casing, said cover being seated on the main casing and on said flange.

9. In a fluid meter, the combination of the main casing, external registering mechanism having a primary shaft extending to the inside of said main casing through a bearing in the latter, and a hood inclosing said registering mechanism and said bearing, said hood forming a gas-tight joint with said casing.

In testimony whereof, I have signed my name to this specification, in the presence of two subscribing witnesses.

FREDERICK C. VINEY.

Witnesses:
HARRY L. SMITH,
KATE A. BEADLE.

Copies of this patent may be obtained for five cents each, by addressing the "Commissioner of Patents, Washington, D. C."